July 2, 1957      P. WARGO      2,797,588
TWO-SPEED SPEEDOMETER DRIVE
Filed March 23, 1954
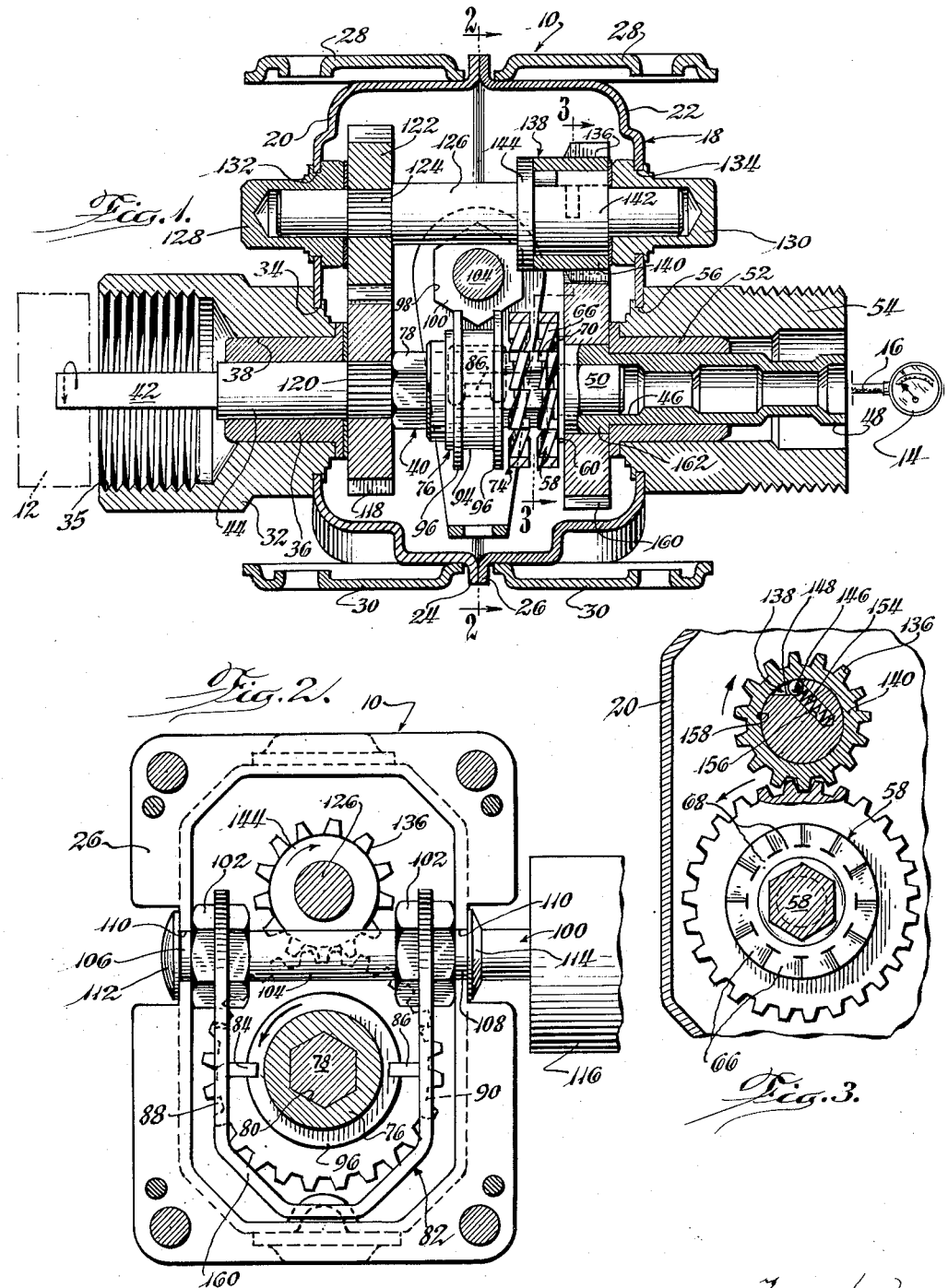

United States Patent Office 2,797,588
Patented July 2, 1957

2,797,588

TWO-SPEED SPEEDOMETER DRIVE

Peter Wargo, Maywood, Ill., assignor to Stewart-Warner Corporation, Chicago, Ill., a corporation of Virginia Application March 23, 1954, Serial No. 418,026

1 Claim. (Cl. 74—368)

The present invention relates to a two-speed, speedometer drive of the type shown in U. S. Patent No. 1,971,166, issued August 21, 1934, to C. M. Read.

Such speedometer drives are adapted for use in vehicles having "rear end" type, two-speed driving mechanisms incorporated into the propelling transmission between the conventional speedometer takeoff and the driving wheels. The controls for the two-speed driving mechanism and the two-speed speedometer drive are interconnected so that the two are shifted simultaneously from one speed to another to cause the speedometer to indicate accurately the vehicle speed at all times.

One object of the invention is to provide an improved two-speed speedometer drive of extremely economical, dependable construction in which a full output speed is produced upon engagement of a direct drive clutch and a reduced output speed is produced through a speed reducing drive including an overrunning clutch as an incident to disengagement of the direct drive clutch.

Other objects and advantages will be apparent from the following description of the form of the invention illustrated in the drawing, in which:

Figure 1 shows a longitudinal sectional view of a speedometer drive incorporating the invention and illustrates schematically the connection of the drive to a vehicle transmission and to a speedometer;

Fig. 2 is a transverse sectional view taken generally along line 2—2 of Fig. 1; and Fig. 3 is a fragmentary sectional view taken generally along the broken line 3—3 of Fig. 1.

As shown in the partially schematic view of Fig. 1, the two-speed, speedometer drive 10 embodying the invention is connected to a takeoff from a vehicle propelling transmission 12 to drive a conventional speedometer 14 through a flexible shaft 16. The vehicle propelling transmission 12 is of the type having a two-speed driving mechanism (not specifically illustrated) interposed between the speedometer drive takeoff and the driving wheels of the vehicle. In general the relationship of the two-speed speedometer drive 10 to the propelling transmission 12 and the speedometer 14 is similar to that of the previously mentioned Patent No. 1,971,166.

The speedometer drive 10 comprises a sheet metal casing 18 formed in two substantially symmetrical sections 20, 22 having mating flanges 24, 26 adapted to be bolted or otherwise fastened together along a medial transverse plane of the casing. Two pairs of support brackets 28, 30 are spotwelded to the upper and lower side of the casing 18.

The inner end of a generally cylindrical coupling sleeve 32 is fastened into an aperture 34 in the lower central portion of the casing section 20. The outer end of the coupling sleeve 32 is counterbored and internally threaded as at 35 to receive a stationary sleeve or the like (not shown) leading from the conventional speedometer takeoff on the vehicle propelling transmission 12.

A bushing 36 mounted in an axial bore 38 in the sleeve 32 supports a rotary drive shaft 40 machined from hexagon shaped bar stock. The outer end 42 of the shaft 40 is squared to couple with a member (not shown) rotated by the speedometer takeoff on the vehicle propelling transmission 12. The portion of the shaft 40 extending through the bushing 36 is turned down to form a circular journal 44.

From the support bushing 36, the drive shaft 40 extends across the casing 18 into a counterbore 46 in the inner end of a generally cylindrical driven member 48 mounted in axial alignment with the driving member. The end of the shaft 40 supported in the driven member 48 is turned down to a circular journal 50 freely rotatable within the counterbore 46.

The driven member 48 is supported by a bushing 52 mounted in a centrally bored coupling sleeve 54 having an inner end fixed into an aperture 56 in the casing section 22. The outer end of the driven member 48 is shaped in a conventional manner to connect with the adjacent end of the flexible speedometer drive shaft 16. The covering sheath of the drive shaft 16 (not specifically illustrated) is connected to the externally threaded outer end of the sleeve.

The extreme inner end of the driven member 48 carries a sheet metal clutch disc 58 staked and brazed against a thin radial shoulder 60 formed on the driven member in axially spaced relation to the inner end of the support bushing 52. The periphery of the clutch disc 58 is cut into a series of radial projections 66 (Fig. 3) each connected to the central portion of the disc by a relatively narrow neck 68. Each radial edge of each projection 66 is offset axially from the contiguous edge of the adjacent projection by twisting each projection in the same direction about a radial axis extending centrally through the projection.

The radial edges of the projections 66 thus exposed on the inner face of the clutch disc 58 form a circumferential series of somewhat resilient clutch teeth 70, as shown in Fig. 1.

The clutch disc 58 on the driven member 48 coacts with a similar clutch disc 74 brazed and staked on the adjacent end of a clutch collar 76 encircling an intermediate section 78 of the driving shaft 40. This driving shaft section 78 has the original hexagon shaping of the bar stock from which the shaft is formed and extends through a hexagon shaped axial opening 80 in the clutch collar 76 to form an axially slidable, rotary driving connection with the collar.

The collar 76 and the attached clutch disc 74 are shifted along the driving shaft 40 into and out of driving engagement with the clutch disc 58 by a U-shaped operating yoke 82 embracing the collar. Two actuating lugs 84, 86 turned inwardly from the central portions of the two upwardly extending legs 88, 90 of the yoke 82 extend into an annular groove 94 formed between two axially spaced shoulders 96 on the operating collar 76.

Axially aligned hexagon shaped openings 98 formed in the upper ends of the respective operating yoke legs 88, 90 receive a transverse operating shaft 100 formed from hexagon bar stock. Sections 102 of the shaft 100 which extend through the yoke legs 88, 90 have the original shape of the bar stock and form rotary driving connections with the legs. The central portion 104 of the shaft 100 is turned down to a smaller diameter to clear adjacent drive structure compactly arranged in the casing 18.

At the outer ends of the two hexagon sections 102, the clutch operating shaft 100 is turned down to form two short cylindrical journals 106, 108 which bear in circular openings 110 in the opposing side walls of the casing 18. These openings are formed by aligned semicircular recesses formed in the mating edges of the casing sections 20, 22 to receive opposite sides of the shaft journals 106, 108 when the casing sections are fastened together.

An enlarged head 112 left on the shaft 100 at the outer end of the journal 106 engages the adjacent exterior surface of the joined casing sections 20, 22. A radial collar 114 left on the shaft 100 at the outer end of the journal 108 also engages the exterior surface of the casing 18.

The shaft 100 extends beyond the collar 114 to connect with a circular solenoid actuator 116 (shown schematically in Fig. 2) capable of imparting rotary shifting movement to the shaft, which is transmitted to the clutch collar 76 as linear shifting movement. The operating circuit for the solenoid 116 is interconnected with the standard controls (not shown) for the two-speed drive mechanism interposed in the vehicle transmission between the speedometer takeoff and the driving wheels so that the solenoid imparts a counterclockwise shifting movement to the shaft 100, as viewed in Fig. 1, to clutch the driving shaft 40 directly to the driven member 48 when the drive mechanism in the vehicle transmission is shifted to rotate the vehicle wheels at the higher speed. Upon shifting of the drive mechanism to decrease the speed of the vehicle wheels in relation to the transmission speed at the speedometer takeoff, the solenoid 116 operates to shift the shaft 100 and the clutch collar 76 in the opposite direction to disconnect the direct coupling between the driving shaft 40 and the driven member 48.

The specific design of the electrical controls used in interconnecting the solenoid 116 with the two-speed drive mechanism in the vehicle transmission will depend somewhat on the character of the controls for the drive mechanism. The design of such controls is a simple matter to a person skilled in the art and need not be described in further detail. Moreover, it will be understood that the clutch operating shaft 100 may be actuated by a vacuum or fluid pressure operated motor, or by mechanical means interconnected with the controls for the two-speed driving mechanism, depending upon the character of the control for the two-speed transmission employed on the vehicle. Mechanical interconnecting structure of this general character is shown in the previously mentioned Patent No. 1,971,166.

Upon disengagement of the clutch disc 74 from the clutch disc 58 the driven member 48 is rotated at a reduced speed by a speed-reducing drive permanently connected between the driving shaft 40 and the driven member. The reduced speed drive comprises a gear 118 pressed onto a knurled section 120 of the driving shaft 40 between the journal 44 and the hexagon shaped section 78. The gear 118 meshes with a second gear 122 pressed onto a knurled section 124 of an intermediate shaft 126 parallel to the driving shaft 40. The opposite ends of the intermediate shaft 126 are journaled in bushings 128, 130 mounted in apertures 132, 134 in the respective casing sections 20, 22 just above the coupling sleeves 32 and 54.

The end of the intermediate shaft 126 opposite from the gear carries a third gear 136 which is rotated by the intermediate shaft through a one-way or overrunning clutch 138. The clutch allows the gear 136 to rotate faster than the shaft 126 in the same direction as the shaft.

As shown, the third gear 136 comprises relatively narrow gear teeth formed on the outer end of a sleeve 140 encircling a radially enlarged cylindrical section 142 of the shaft 126 between a radial collar 144 on the shaft and the inner end of the bushing 130. A clutch roller 146 (Fig. 3) is mounted in an L-shaped, axial cut 148 in the exterior cylindrical surface of the enlarged shaft section 142. A light compression spring 154 largely contained in an off-center bore 156 in the shaft section 142 urges the roller 146 toward the shallow side or trailing edge of the cut 148 in relation to the direction of rotation of the shaft 126.

Upon rotation of the intermediate shaft 126 in a clockwise direction, Fig. 3, the roller 146 is jammed between the shallow outer edge of the cut 148 and the inner surface of the gear sleeve 140 to rotate the third gear 136 with the shaft. This clutching action is further assured by a shallow axial groove 158 cut into the inner cylindrical surface of the gear sleeve 140 to receive a portion of the roller 146. The third gear 136 may rotate freely in the clockwise direction in relation to the intermediate shaft 126, the roller 146 being urged by the gear sleeve 140 into the deeper side of the cut 148.

The third gear 136 meshes with a fourth gear 160 brazed or otherwise secured to a radially enlarged section 162 of the driven member 48 between the shoulder 60 and the inner end of the support bushing 52.

The pitch diameters of the four gears 118, 122, 136 and 160 of the speed reducing train are proportioned relative to each other to rotate the driven member 48 at a reduced speed in relation to the rotary speed of the driving shaft 40. As a matter of fact, the speed ratio of the driven member 48 to the driving shaft 40 through this speed reducing gear train is made equal to the change in speed ratios effected by the two-speed mechanism in the transmission of the vehicle in which the speedometer drive is used.

When the driving member 40 is clutched directly to the driven member 48 the third gear 136 rotates counterclockwise on the intermediate shaft 126 as viewed in Fig. 3. Upon disengagement of the direct drive clutch the one-way clutch connection 138 between the intermediate shaft 126 and the third gear 136 operates automatically to continue rotation of the driven member 48 in the same direction but at reduced speed, which causes the connected speedometer 14 to continue an accurate indication of the ground speed of the vehicle.

While I have shown and described a preferred embodiment of my invention, it will be apparent that variations and modifications thereof may be made without departing from the principles and scope of the invention. I therefore desire, by the following claim, to inculde all such variations and modifications by which substantially the results of my invention may be obtained through the use of substantially the same or equivalent means.

I claim:

A two-speed speedometer drive comprising, in combination, a casing formed generally in two sections separable along a medial plane of the casing, a first rotary drive member journaled in one of said casing sections and adapted to be connected with a vehicle transmission, a second rotary drive member journaled in the other casing section in axial alignment with said first drive member and adapted to be connected with a speedometer, a speed reducing train of continuous mesh gears mounted within said casing for rotating said second drive member from said first drive member at a reduced speed in relation to the latter, means permanently connecting the high speed end of said gear train to said first rotary drive member, means permanently connecting the low speed end of said gear train to said second drive member, said speed reducing gear train including a one-way roller clutch in series therewith for transmitting rotary movement of the driving member through the gear train to the driven member, a first direct drive clutch member on one of said drive members, a second drive clutch member mounted on a noncircular section of the other drive member for rotation therewith and axial movement thereon into and out of engagement with said first clutch member, said second axially movable clutch member being fully independent of said gear train, a swingable operating member for said second clutch member, an operating shaft for said clutch operating member extending through said casing between said sections thereof, said clutch operating shaft being formed of noncircular stock material, said clutch operating member defining a noncircular opening therein shaped to receive the noncircular section of the operating shaft to form a torque transmitting connection therebetween, and two sections of said clutch operating shaft on opposite sides of said operating member being necked down to reduced diameters to form shaft support journals bearing in said casing between said sections thereof.

References Cited in the file of this patent

UNITED STATES PATENTS

| | | |
|---|---|---|
| 708,286 | Wild | Sept. 2, 1902 |
| 1,101,539 | Halbleib | June 30, 1914 |
| 1,124,280 | Brackette | Jan. 12, 1915 |
| 1,971,166 | Read | Aug. 21, 1934 |